(12) United States Patent
Nguyen

(10) Patent No.: US 11,097,717 B2
(45) Date of Patent: Aug. 24, 2021

(54) ELECTRIC VEHICLES WITH EXTENDED RANGE

(71) Applicant: Tai Dung Nguyen, Fremont, CA (US)

(72) Inventor: Tai Dung Nguyen, Fremont, CA (US)

( * ) Notice: Subject to any disclaimer, the term of this patent is extended or adjusted under 35 U.S.C. 154(b) by 237 days.

(21) Appl. No.: 15/967,902

(22) Filed: May 1, 2018

(65) Prior Publication Data

US 2018/0244161 A1 Aug. 30, 2018

Related U.S. Application Data

(63) Continuation-in-part of application No. 15/075,205, filed on Mar. 21, 2016, now Pat. No. 9,956,873,
(Continued)

(51) Int. Cl.
*B60W 20/13* (2016.01)
*B60W 30/182* (2020.01)
*B60W 50/08* (2020.01)
*B60L 8/00* (2006.01)
*B60L 1/14* (2006.01)
*B60L 1/02* (2006.01)
(Continued)

(52) U.S. Cl.
CPC ............ *B60W 20/13* (2016.01); *B60K 6/48* (2013.01); *B60K 6/52* (2013.01); *B60L 1/003* (2013.01); *B60L 1/02* (2013.01); *B60L 1/14* (2013.01); *B60L 8/003* (2013.01); *B60L 8/006* (2013.01); *B60L 50/16* (2019.02); *B60L 50/62* (2019.02); *B60W 20/20* (2013.01); *B60W 30/182* (2013.01); *B60W 50/082* (2013.01); *B60L 2260/28* (2013.01); *Y02T 10/62* (2013.01); *Y02T 10/7072* (2013.01); *Y02T 10/72* (2013.01); *Y02T 90/14* (2013.01)

(58) Field of Classification Search
CPC ...... B60L 50/16; B60L 50/62; B60L 2260/28; B60W 20/00–15; B60W 20/19; B60W 20/20; B60W 20/40; B60W 30/184; B60W 30/1846; B60W 30/186; B60W 30/19; B60W 30/182; B60W 50/082; B60K 6/48–485; B60K 6/52; B60K 6/42; B60K 2006/4808–4841; Y02T 10/6213–6269; Y02T 90/14
See application file for complete search history.

(56) References Cited

U.S. PATENT DOCUMENTS

2010/0004807 A1* 1/2010 Kydd ............... B60L 50/16
701/22
2010/0084211 A1* 4/2010 Seidel .............. B60L 15/20
180/294
(Continued)

OTHER PUBLICATIONS

Honda, "GX200", Accessed Apr. 16, 2018, http://rn.engines.honda.com/models/model-detail/GX200 (Year: 2018).*

*Primary Examiner* — Spencer D Patton
(74) *Attorney, Agent, or Firm* — Tue Nguyen

(57) ABSTRACT

An electric vehicle can include an electric drive capable of moving the vehicles, together with a non-battery operative feature to enhance the performance of the vehicle, such as extending the range or increasing the power. The non-electrical enhanced feature is independent and not integrated with the electric drive, to enable the return of the vehicle design to pure electrical power with minimum modification.

19 Claims, 9 Drawing Sheets

Related U.S. Application Data which is a continuation of application No. 13/296,196, filed on Nov. 14, 2011, now Pat. No. 9,290,098.

(60) Provisional application No. 61/413,480, filed on Nov. 15, 2010.

(51) Int. Cl.
| | |
|---|---|
| *B60L 1/00* | (2006.01) |
| *B60K 6/48* | (2007.10) |
| *B60L 50/16* | (2019.01) |
| *B60L 50/62* | (2019.01) |
| *B60K 6/52* | (2007.10) |
| *B60W 20/20* | (2016.01) |

(56) References Cited

U.S. PATENT DOCUMENTS

2012/0123623 A1\* 5/2012 Nguyen .................. B60K 6/48
                                                                701/22
2018/0037104 A1\* 2/2018 Ai ............................ F16H 3/12

\* cited by examiner

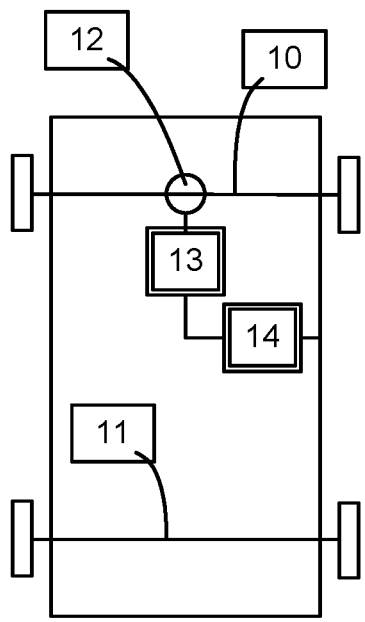
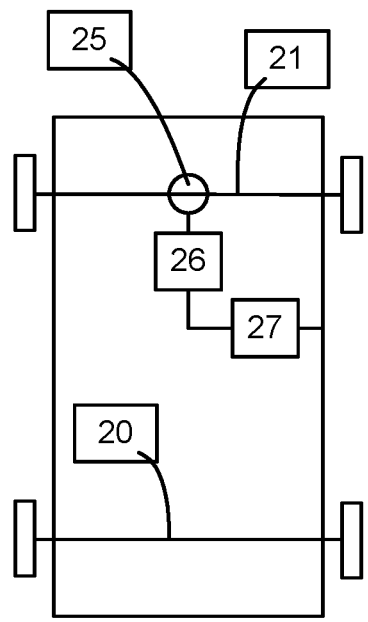
Fig. 1A (Prior Art)
Fig. 1B (Prior Art)
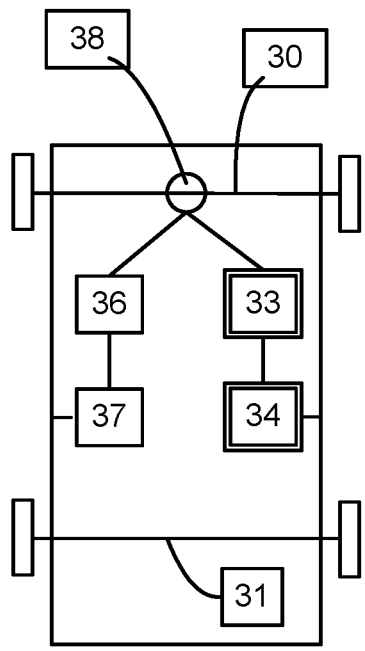
Fig. 1C (Prior Art)

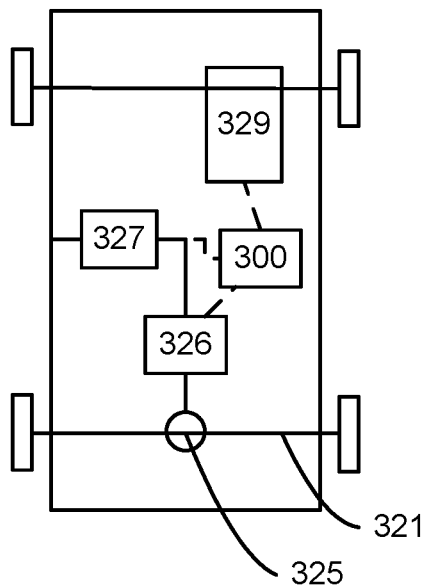
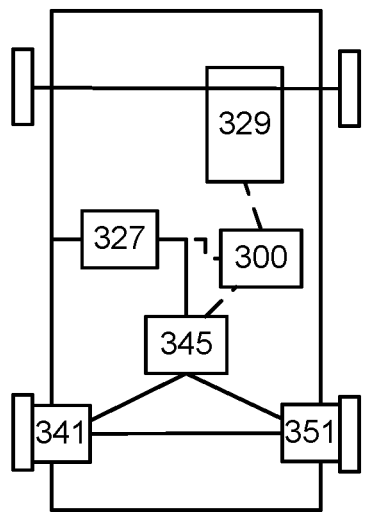
Fig. 3A
Fig. 3B
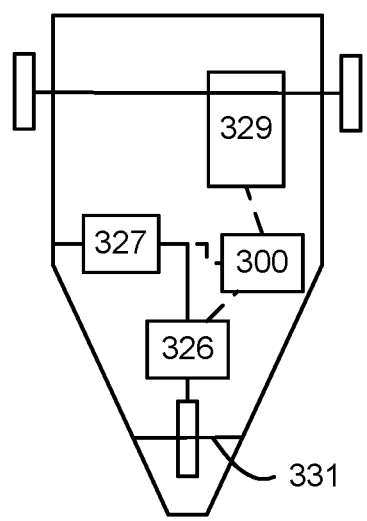
Fig. 3C

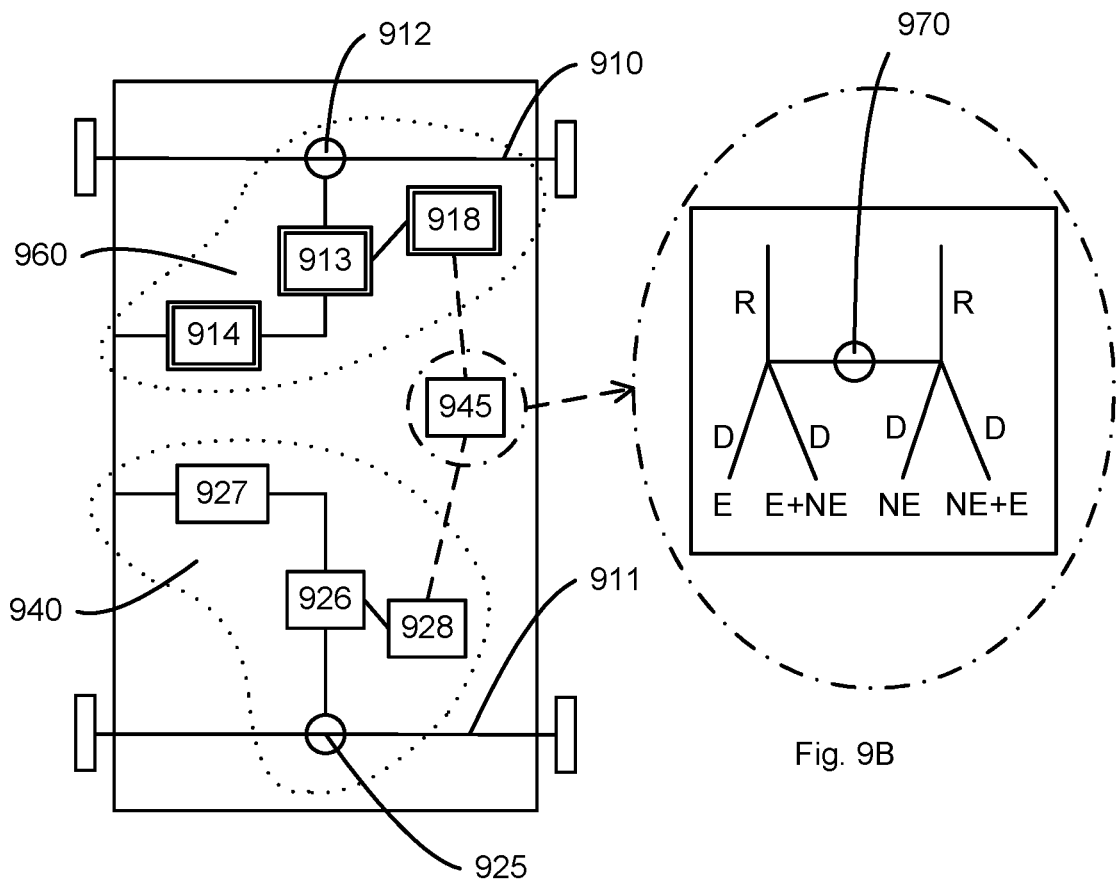
Fig. 9B
Fig. 9A
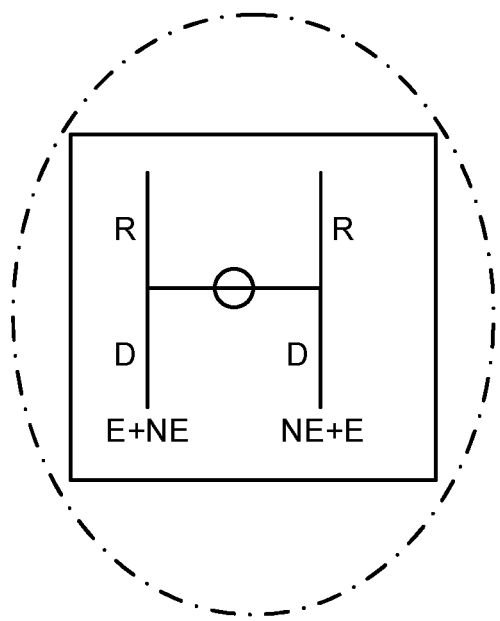
Fig. 9D
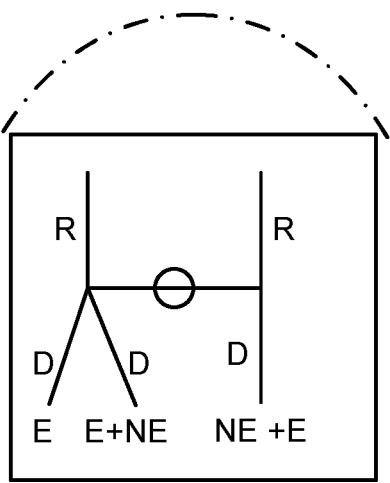
Fig. 9C

ELECTRIC VEHICLES WITH EXTENDED RANGE

This application is a continuation-in-part of U.S. patent application Ser. No. 15/075,205, filed on Mar. 21, 2016, entitled "Electric vehicles with extended range", now U.S. Pat. No. 9,956,873, issued on May 1, 2018, which is a continuation of and claims priority from U.S. patent application Ser. No. 13/296,196, filed on Nov. 14, 2011, entitled "Electric vehicles with extended range", which claims priority from U.S. provisional patent application Ser. No. 61/413,480, filed on Nov. 15, 2010, entitled "Electric vehicles with extended range", all of which are incorporated herein by reference.

The invention relates to electric vehicles that are driven by an electric drive, and methods of controlling the vehicles.

Conventional vehicles, such as passenger cars or automobiles, Sports Utility Vehicles (SUV), trucks use fossil-fuel powering an internal combustion engine. Fuel cost and environmental concern for this type of engine have promoted a need for alternatives.

FIG. 1A illustrates a schematic of a vehicle with an internal combustion engine drive system. The drive system typically includes an engine 13 coupled to a transmission 12 to drive the vehicle axle 10. A fuel tank 14 provides fuel, such as gasoline or diesel, to the engine 13. As shown, the vehicle is a two wheel drive, with the other axle 11 not actively powered. The vehicle can be front-wheel drive or rear-wheel drive. There are other configurations of vehicle architectures, such as four-wheel drive configurations.

Currently, there is pressing concern that oil supply will soon be not adequate to meet the rising demands of energy consumption. In addition, there are serious environmental issues, such as green house emission, associated with internal combustion engines employing gasoline or diesel.

Electric vehicles have gained popularity in recent years as the potential replacement for internal combustion vehicles, since they promise zero emission from electric drive system, and a break away from oil dependency.

FIG. 1B illustrates a schematic of a vehicle with an electric drive system. The drive system typically includes an electrical motor 26 coupled to a transmission 25 to drive the vehicle axle 21. A battery 27 provides electrical power to the motor 26. As shown, the motor powers a two wheel axle, with the other axle 20 not actively powered. The electric motor can power one axle, two axles, or individual wheels.

At the present time, battery and motor technology presents a major drawback for electric vehicles, which translates to lower power and short range. A common problem is the weight and cost of the batteries, which is large and heavy. Furthermore, the capacity of the battery degrades with successive charging cycles. For example, the range of the electric vehicle is generally proportional to the amount of electrical energy stored in the battery. But battery power density is low, and thus the battery contributes significant weight and mass to the electric vehicle, and thus affects the available range and performance of the electric vehicle.

A temporary solution to the shortcoming of battery technology is a combination of electric power and combustion engine, which reduces the fuel consumption, increases the power, and extends the range of the electrical motor. For example, an alternate fuel vehicle employs an integration of a diesel or gas powered engine and an electric motor. Engine can be used to drive the vehicle, or as a source to charge the battery for the electric power. Other sources can also be employed to charge the batteries including solar, wind, hydraulic, compressed air, bio energy sources.

FIG. 1C illustrates a vehicle having a combination of electrical motor and combustion engine. The vehicle includes an engine 33 coupled to a gas tank 34, a motor 36 coupled to battery 37, and a power splitting mechanism 38 to allow the engine 33 and the motor 36 to drive the axle 30. These types of vehicles have improved performance, but they deviate from the path of electric vehicles, e.g., it is difficult to return to pure electric vehicles from these designs.

Therefore, it would be ideal to create an electric vehicle that has improved performance and at the same time, prepares the path to future electric vehicle generations when better battery technology and electric motors are available.

BRIEF DESCRIPTION OF THE DRAWINGS

FIG. 1A illustrates a schematic of a vehicle with an internal combustion engine drive system.

FIG. 1B illustrates a schematic of a vehicle with an electric drive system.

FIG. 1C illustrates a vehicle having a combination of electrical motor and combustion engine.

FIGS. 3A-3C illustrate exemplary configurations for the electric drive system according to some embodiments of the present invention.

FIGS. 9A-9D illustrate an exemplary hybrid vehicle according to some embodiments.

DETAILED DESCRIPTION OF THE PREFERRED EMBODIMENTS

The present invention discloses electric vehicles and methods to operate such vehicles. The electric vehicle comprises an electric drive capable of moving the vehicles, together with a non-electrical feature to enhance the performance of the vehicle, such as extending the range or increasing the power. In the present description, "electrical" sometimes means "battery", and "non-electrical" sometimes means "non-battery". The electric drive is powered by the battery, and the non-electrical feature is powered by non-electrical power (or non-battery power), such as by natural gas, gasoline or diesel, compressed air, solar panel, or other power sources. The non-electrical enhanced feature is independent and not integrated with the electric drive, to enable the return of the vehicle design to pure electrical power with minimum modification. In some embodiments, the non-electrical feature is only coupled with the electric drive at the start-stop level, such as a manual or automatic switch that turns on or off the enhanced feature, so that the enhanced feature can operate in addition, or in replacement, of the electric drive.

In some embodiments, the non-electrical enhanced feature comprises at least one of a non-electric drive coupled to a free (e.g., an axle that is not powered by the electric drive) axle of the electric vehicle; a generator coupled to a free axle for charging the battery; a non-electrical generator for charging the battery; and non-electrical system providing support function, such as an air conditioner, a vehicle fan, a vehicle heater, electronic components or devices, or a lighting subsystem operated by solar panel, by compress air, by gasoline or diesel, or by natural gas. The non-electrical generator and/or support system can also be coupled to the non-electric drive. As stated above, non-electrical can include solar power, thus electrical means battery in some embodiments of the present invention.

Figure 2:
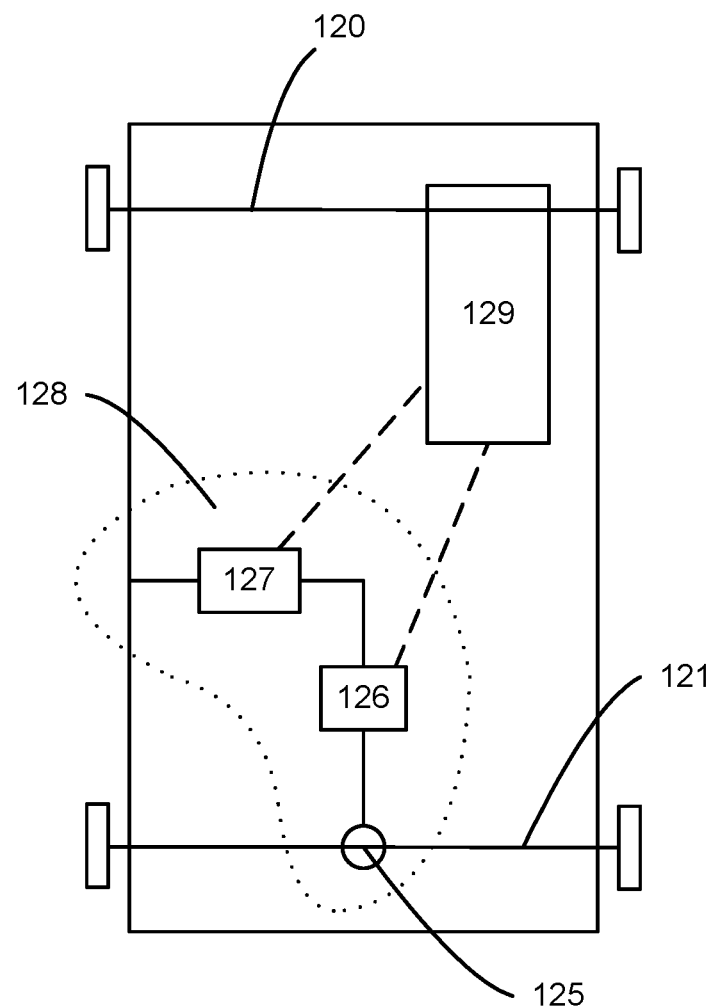
FIG. 2 illustrates an exemplary schematic configuration of an electric vehicle according to some embodiments of the present invention.

FIG. 2 illustrates an exemplary schematic configuration of an electric vehicle according to some embodiments of the present invention. The electric vehicle comprises an electric drive system 128, for example, an electrical motor 126 coupled to a gearbox 125 to drive the vehicle axle 121. A battery 127 provides electrical power to the motor 126. As shown, the electric motor 126 powers a two wheel axle (e.g., front or back axle), but other electric drive systems are also within the scope of the present invention, such as electric drive operating multiple axles, or operating individual wheels (e.g., one, two, three, four, or more wheels). For example, an electrical motor can operate one wheel of a three-wheel vehicle, or two electrical motors can operate two or more wheels of a four-wheel vehicle. The term "electrical", in this context, means "battery". Alternatively, the electric drive system can use other form of electrical power, such as solar panel, or a combination of solar and battery.

The electric drive system can be a main drive for the vehicle, using a motor or a motor/generator assembly coupled to the axle through direct drive, gear box or clutch. The battery system provides power to the electric drive. The electric vehicle can have power management to conserve battery power, controller to maintain proper current to the motor, capacitors to regulate or trickle charge the battery power, and other components such as regenerative brake, generator for battery recharge or plug-in battery recharger.

The electric vehicle further comprises a non-electrical powered assembly 129 to enhance the performance of the electric vehicle without interfering with the independent operation of the vehicle. For example, the assembly 129 can comprise a non-electrical powered drive coupled to the free axle 120 to operate the vehicle, for example, when the electric drive does not operate. The assembly can comprise a non-electrical power generator to charge the battery, thus extending the range of the electric vehicle. The assembly 129 can comprise a non-electrical powered support system, such as a compress-air powered air conditioner, to reduce the power consumption of the battery, thus not affecting the range of the vehicle with supporting usages. The support system can comprise vehicle fan, vehicle lighting (head lights, tail lights, emergency lights, etc.), vehicle heater, electronic components (radio, global positioning system, compact disk player, telephone), etc.

The non-electrical assembly can be coupled to an axle, for example, axle 120, to either drive the vehicle or to receive rotational power from the rotated axle 120. The non-electrical assembly can be not coupled to any axle, stationed within the vehicle without attaching to any axle. For example, the non-electrical assembly can provide support usage to the vehicle, e.g., usage non related to driving the vehicle.

The non-electrical assembly can receive power from non-battery source, such as compressed air, natural gas, gasoline, diesel, solar panel, etc. In general, the term non-electrical used in the present invention can include non-battery (such as solar power), in addition to non-electrical current.

In general, the non-electrical assembly 129 can extend the range of the vehicle without interfering with the operation of the electric drive system, allowing the incorporation of advanced developments in electric vehicles, such as better motor or better battery with minimum changes. With the assembly 129 not integrated with the electric drive, removing the assembly 129 or upgrading the electric drive system is a simple task and can be performed without affecting the electric vehicle operation. In some embodiments, the electric drive system is the main power for the electric vehicle, offering a fully electric vehicle system with the non-electrical assembly serving as a back up system, generally operating only when needed.

FIGS. 3A-3C illustrate exemplary configurations for the electric drive system according to some embodiments of the present invention. FIG. 3A shows a four-wheel two-axle vehicle having an electric drive system coupled to one axle 321, either the front or the back axle. The electric drive system comprises battery 327 powering a motor 326, which is coupled to the axle 321 through gear system 325. A controller 300 couples to the battery 327 and the motor 326 to start, stop and in general, to control the power to be applied to the motor. A non-electrical assembly 329 is supplied to improve the performance of the electric vehicle, such as for extending the range of the vehicle. The assembly 329 can be totally separated from the electric drive system or only coupled to the controller 300 in order not to interfere with the main power drive of the electric drive.

FIG. 3B shows a vehicle having electrical motors 341/351 coupled to two wheels of the vehicle. A synchronizer 345 is included to control the power applied to the two motors in order to prevent slippage. The wheels can be arranged in pairs, e.g., forming an axle, with a gearbox to allow the motor to drive both wheels together. The gearbox can include speed change gearing, differential gearing, transfer case gearing, drive shafts, constant velocity joints, and any other components.

A vehicle may alternatively include a single wheel at one of the front or rear ends of the vehicle. FIG. 3C shows a three-wheel vehicle having an electric drive system coupled to a single wheel 331. Other configurations can also be used, for example, electrical motor coupled to a wheel in three-wheel vehicles, or vehicles with three or more axles.

The present electric vehicle further comprises a non-electrical powered assembly (including non-battery powered assembly) to enhance the performance of the electric vehicle without interfering with the independent operation of the vehicle. In some embodiments, the assembly comprises a non-electrical powered drive coupled to the free axle (e.g., axle not connected to the electric drive) to operate the vehicle in a preferably mutually exclusive mode with the electrical powered drive system. The non-electrical powered drive operates independently and is coupled to the electric drive by a manual or semi-automatic switch that allows only the operation of either the electric drive or the non-electric drive. This assembly feature can provide a range extending feature to the electric vehicle, e.g., allowing the electrical vehicle to switch to non-electrical powered drive when running out of battery power, or to charge the battery with the non-electrical powered drive while running. The configuration also provides the simplicity of the electric vehicle design, with the electric drive and the non-electric drive decoupled from each other. Switching from one drive to another drive can be performed by a manual switch, operated by a driver whenever desired. Switching can also be performed semi-automatically, for example, when the battery is running out to keep the vehicle operating continuously. In some embodiments, during the operation of the non-electric drive, the battery can be charged, for example, through the motor operated as a generator, through an additional generator coupled to the non-electric drive or to the driving axle.

One advantage of the present invention is the independent electric drive, e.g., the non-electrical portion is not intimately integrated with the electric drive. This feature can allow upgrading the electric drive by replacing appropriate components, e.g., replacing the electric motor with more power and better efficiency models, replacing the battery assembly with higher capacity models, etc. The present invention realizes the non-maturity of the electric vehicle, and thus offers models to allow ease of upgrading.

Figure 4:
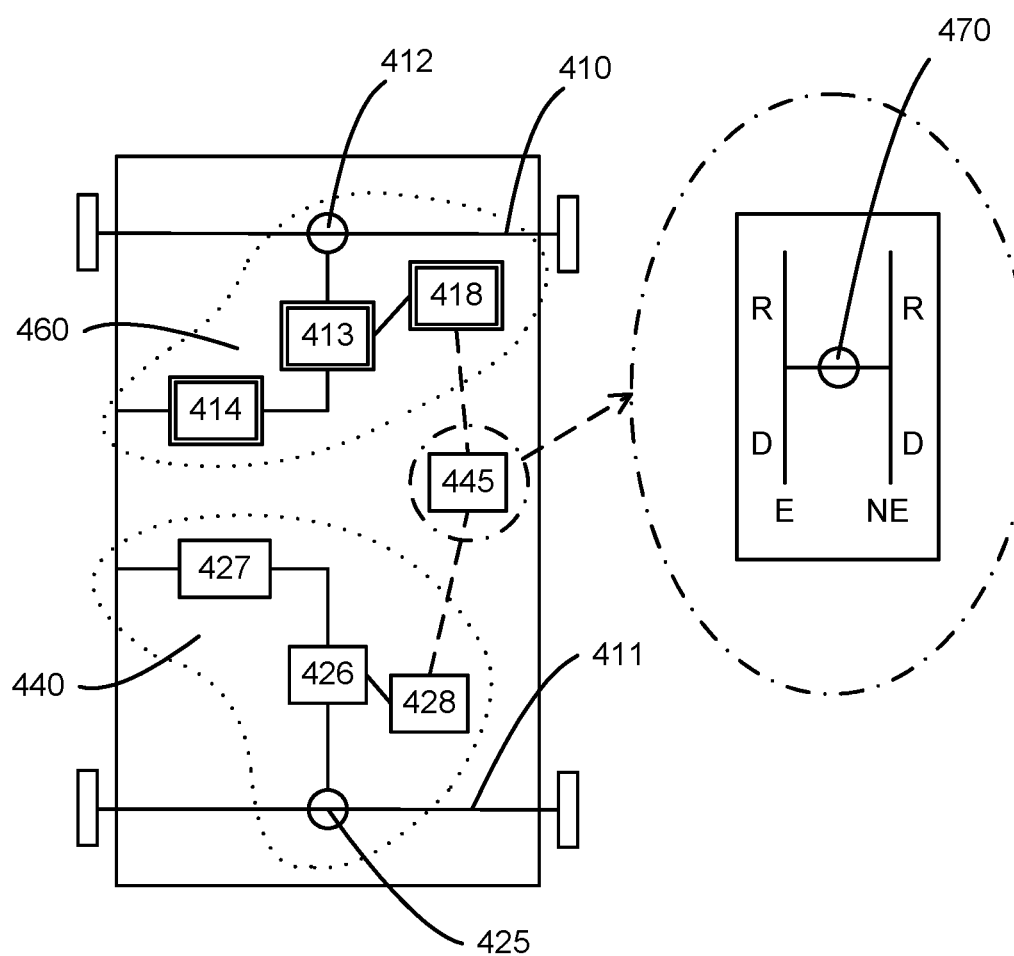
FIG. 4 illustrates an exemplary electric vehicle according to some embodiments of the present invention.

FIG. 4 illustrates an exemplary electric vehicle according to some embodiments of the present invention. The vehicle comprises an electric drive system 440 coupled to axle 411 to operate the vehicle. In some embodiments, the electric drive system comprises a battery 427 powering a motor 426, which is coupled to gearbox 425 to drive axle 411. An optional controller 428 is coupled to the motor 426 to control the motor, such as providing more power when needing high acceleration, or to regulate the power to the motor to optimize the consumption of electrical power from the battery. As shown, the electric drive system 440 represents an exemplary electric drive system. Other electric drive systems can also be used, such as motor-on-wheel and battery management system.

In some embodiments, the electric vehicle comprises a non-electric (included non-battery) drive assembly 460, which comprises a non-electric power train. The non-electric drive assembly 460 comprises a non-electric engine, for example, an internal combustion engine 413, powered by a power source, for example, a gasoline tank 414, and coupled to a gearbox 412 to drive the axle 410. The non-electric drive assembly 460 can comprise an optional controller 418 coupled to the engine 413 to control, monitor, and optimize power consumption. The non-electric drive assembly 460 can drive the axle 410 independent of the electric drive system 440 driving the other axle 411. In some embodiments, the non-electric drive assembly 460 can drive the axle 411, for example, by sharing a gear box 419 with the electric drive assembly, or by a separate coupling with the axle 411. For example, the drive systems 440 and 460 drive the axle 411 of the electric vehicle through a mutually exclusive gearbox 419. In some embodiments, the electric drive assembly and the non-electric drive assembly are independently operated, thus if sharing an axle, one drive is decoupled from that axle so that the other drive can operate.

In some embodiments, the non-electric engine comprises a motor powered by a solar panel, an engine powered by natural gas, or an engine powered by compressed air.

A vehicle controller 445 coupled to the electric drive system 440 and the non-electric drive assembly 460, for example, to control both drive systems. The two drive systems are separate and operate independent of each other, with only the controller 445 connecting the two systems. Thus any non-electric drive technology can be used without any modification. In addition, the electric drive system can also be easily upgraded with advanced electric drive technology, such as better battery or better motor. The present electric vehicle is ready for today technology, ready to incorporate better electric power technology, and employing current non-electric power technology without any needless modifications.

In some embodiments, the controller 445 allows a mutually exclusive operation of the electric and non-electric power drives, e.g., only one drive operates the vehicle at any one time. This exclusiveness allows a simple control of both drives, for example, when the control 470 is moved to the electric drive E, the electric drive system is engaged (or turned on), and the non-electric drive system is disengaged (or turned off). Conversely, when the control 470 is moved to the non-electric drive NE, the electric drive system is disengaged (or turned off), and the non-electric drive system is engaged (or turned on). Short start up time for electric drive may mean instantaneous power when turned on, so for electric power, engaging and disengaging could mean powering on and powering off. For non-electric power, disengaging might mean an idle position, where the drive is turned on but not engaged.

In some embodiments, the controller 445 is a manual controller, under the exclusive control of the driver. The manual controller offers great control to the driver without or with minimum loss of control. For example, the driver knows when to stop the electric drive, and when to start the non-electric drive. Sensors could help to inform the driver of the conditions of the vehicle, such as the level of battery, and how far can the vehicle travel under electric power. Power conservation could be best performed by the driver, instead of an automatic controller. In some embodiments, the controller 445 can have a partially automatic mode, for example, by automatically switching to non-electric power when the electric power is depleted.

Figure 5A:
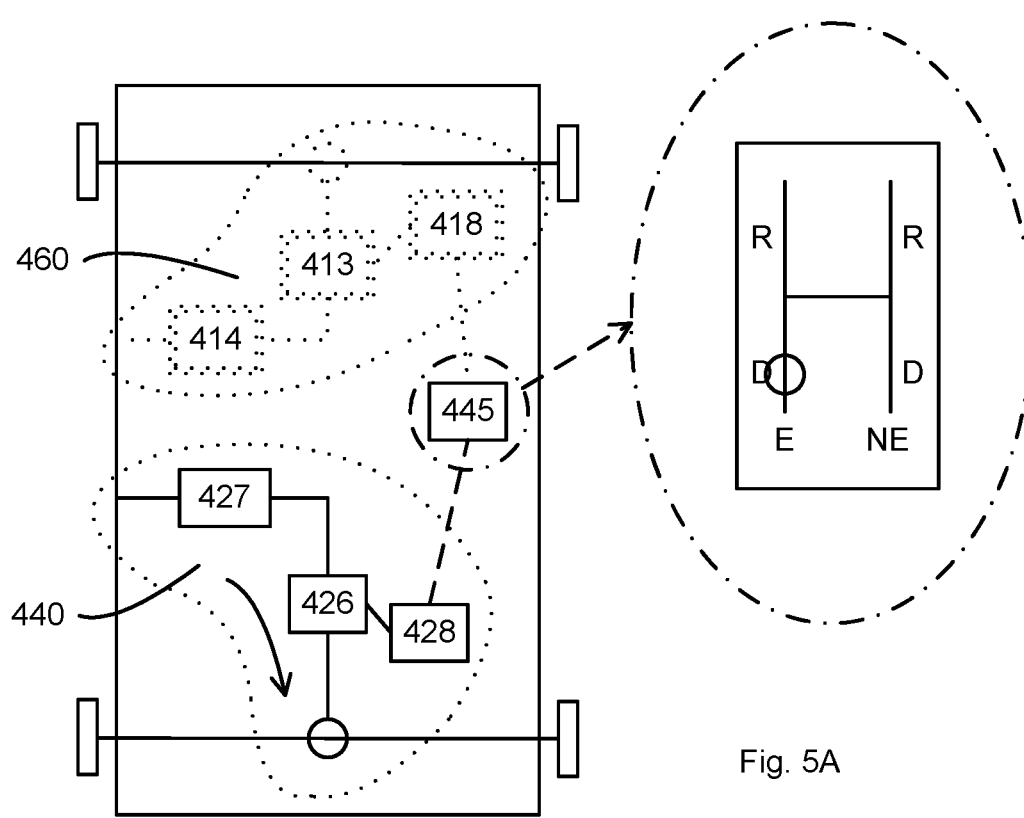
FIGS. 5A-5B illustrates two exclusive modes of operation for the present electric vehicle according to some embodiments of the present invention.
Figure 5B:
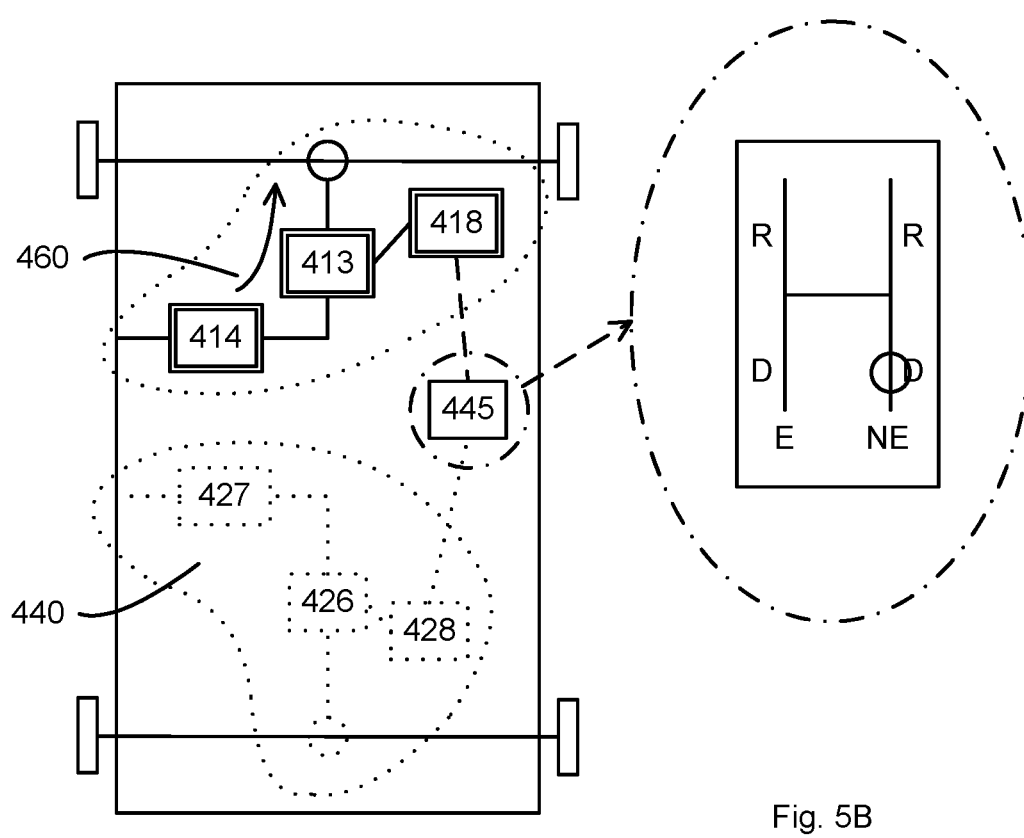

FIGS. 5A-5B illustrates two exclusive modes of operation for the present electric vehicle according to some embodiments of the present invention. When the control 470 is switched to electric drive, the vehicle is powered by the electric motor with the non-electric engine turned off or disengaged (FIG. 5A). When the control 470 is switched to non-electric drive, the vehicle is powered by the non-electric motor with the electric engine turned off or disengaged (FIG. 5B). The mutually exclusive mode of operation can simplify the vehicle requirements, for example, by not needing a synchronization assembly to synchronize the front wheels with the back wheels since these wheels are driven by different power systems.

The non-electric engine is an engine that is not powered by electrical power or by battery power, e.g., a motor, including a gasoline internal combustion engine, a diesel engine, a bio-diesel engine, a hydrogen-powered engine, an ethanol powered engine, a natural-gas powered engine, a fuel-cell engine, a steam engine, a compressed-air engine (e.g., an engine operated by compressed air), a motor powered by a solar panel, or any combination thereof.

One purpose of the non-electric drive assembly 460 is to extend the range of the electric vehicle. A major concern of electric vehicles is the limited range of the battery, together with the limited availability of charging station and the long time needed to fully charge the battery. Thus range extender capabilities could be useful until the electric vehicle technology is mature.

In some embodiments, the non-electric drive assembly 460 is designed to serve as an emergency operation. The emergency operation capability can give the users of electric vehicle some peace of mind, knowing that the electric vehicles won't be stranded in deserted areas. For example, the non-electric drive assembly can comprise a small engine, one that allows emergency operation but not for 100% operation. In some embodiments, the emergency engine can be smaller (either in engine size, power, or speed) as compared to the electric engine or as compared to a conventional gasoline engine. In some embodiments, the emergency engine can offer 30-80% capability of the electric drive system, for example, by providing a vehicle capacity, speed or power of 30-80% of the electric drive system. In some embodiments, the emergency engine offers less than 100%, less than 80%, 50%, or less than 30% of the power or speed of the electric drive. For example, gasoline or diesel engines less than 1 liter, preferably less than 0.75 liter, and more preferably less than 0.5 liter (such as a 350 cc or 250 cc motorcycle engine) can be used in the non-electric drive assembly. The gasoline or diesel engine can comprise 1 cylinder or two cylinders. The small size of engine can reduce the weight and cost of the electric vehicle.

In some embodiments, the non-electric drive assembly 460 is designed to serve for long range operation. A typical battery range is about 100 miles, as compared to a gasoline tank of 400 miles. Thus the non-electric drive assembly can allow the electric vehicle to operate for a longer range without stopping. For example, the electric drive can operate in city streets, and when reaching the highway, the non-electric drive can start.

Figure 6A:
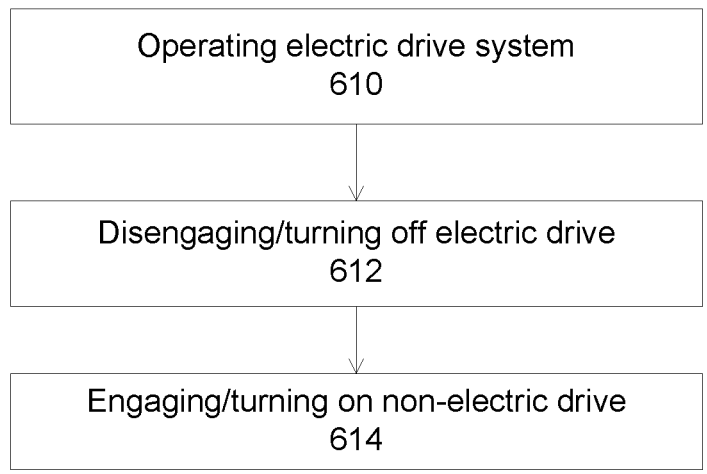
FIGS. 6A-6C illustrate exemplary flowcharts for driving the present electric vehicle according to some embodiments of the present invention.
Figure 6B:
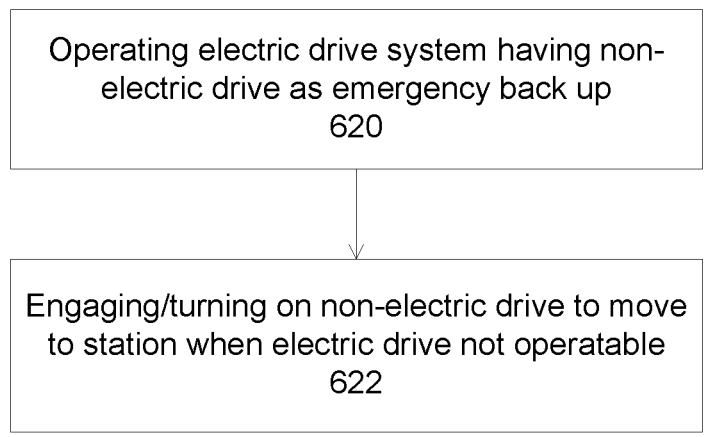
Figure 6C:
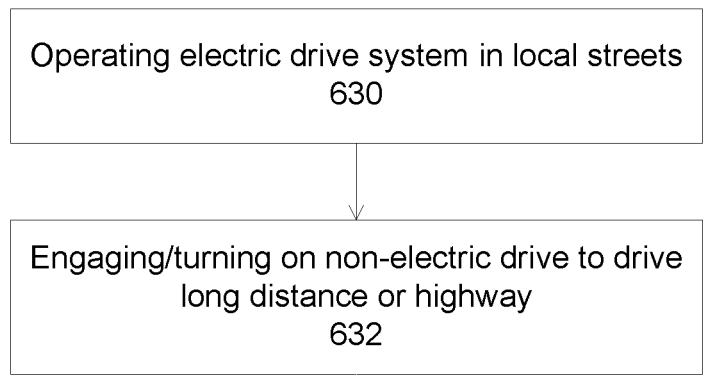

FIGS. 6A-6C illustrate exemplary flowcharts for driving the present electric vehicle according to some embodiments of the present invention. In FIG. 6A, operation 610 provides an operation of an electric vehicle by an electric drive system. Operation 612 disengages or turns off the electric drive. Operation 614 engages or turns on non-electric drive system to move the vehicle, after the electric drive is disengaged or turned off. Reverse operation is also possible, where the non-electric drive is disengaged or turned off before engaging or turning on the electric drive.

In FIG. 6B, operation 620 provides an operation of an electric vehicle by an electric drive system, wherein the electric vehicle comprises a non-electric drive assembly as an emergency back up power train. Operation 622 engages the non-electric power train to move the vehicle, for example, to a battery charging station, when the electric drive system is not capable of moving the vehicle, for example, by running out of battery.

In FIG. 6C, operation 630 provides an operation of an electric vehicle by an electric drive system in local streets. Operation 632 switches from the electric drive to a non-electric drive to drive long distance in highway conditions.

In some embodiments, the electric vehicle further comprises a charging operation when operated by the non-electric drive assembly. For example, the electric motor doubled as a generator, a generator coupled to the axle or to the non-electric drive, or a separately-powered generator can be added to generate electricity to recharge the battery when the non-electric drive assembly is operating.

Figure 7:
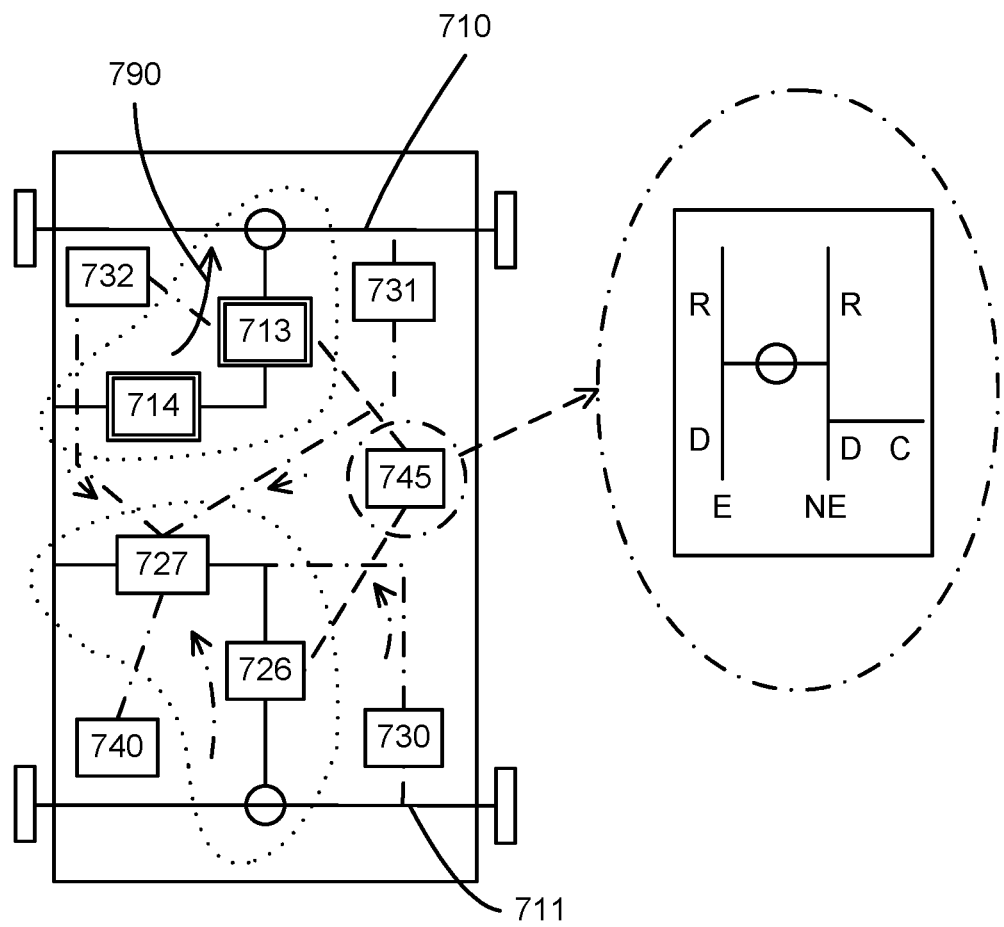
FIG. 7 illustrates exemplary configuration of generator to recharge the battery according to some embodiments of the present invention.

FIG. 7 illustrates exemplary configuration of generator to recharge the battery according to some embodiments of the present invention. When the vehicle is operating under the non-electric power, as shown by arrow 790 showing power going to the non-electric axle 710, the motor 726 can be converted to a generator to recharge the battery 727. Alternatively, a generator 730 or 731 can be coupled to the electric drive axle 711 or 710, respectively, to generate power to charge the battery. Or a generator 732 can be coupled to the non-electric engine 713 to generate power to charge the battery. The generators 726/630/731/732 are powered from the axle, and thus do not need an external power source. Alternatively, a generator 740 received power from the power source 714 of the non-electric drive assembly can be included to charge the battery, with or without any engagement from the electric drive or the non-electric drive systems. The controller 745 can include a control position, for example, C, deviated from the non-electric drive NE to initiate the charging operation. Alternatively, the controller can have a separate control position (not shown) to start the separate generator 740.

In some embodiments, the present electric vehicle can comprise non-electric or non-battery support system, for example, air conditioner, heater, battery charger, fan, electronic support, or lighting. If the support system extracts little power, it can be connected to the battery. If the support system requires a significant amount of power, such as the air conditioner system, a separate non-electric support system with its own power source would help conserve the battery power. For example, an air conditioner running on compressed air can be included to provide the electric vehicle with air conditioner comfort and without interfering with the battery power. The compressed air can be recharged, similar to the battery, when needed. Alternatively, the air conditioner can be powered by a solar panel, or by gasoline powered engine, providing comfort during the heated sun. Other support systems, such as heater, battery charger, fan, electronic support, or lighting can also be powered by non-electric or non-battery power, such as solar panel, compressed air, gasoline, natural, etc.

Figures 8A, 8B:
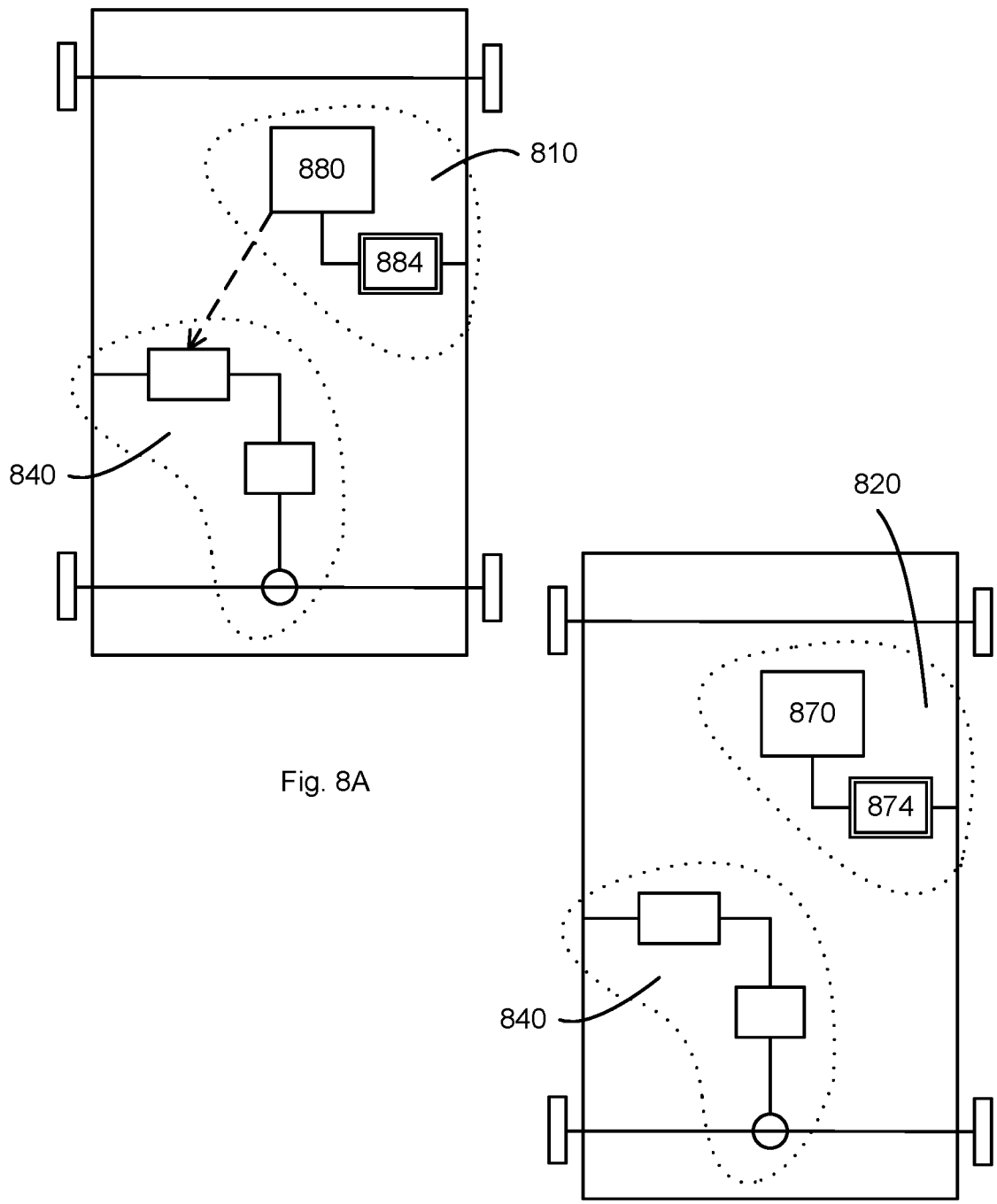
FIGS. 8A-8B illustrate exemplary electric vehicles with non-electric support (including non-battery) system according to some embodiments of the present invention.

FIGS. 8A-8B illustrate exemplary electric vehicles with non-electric support (including non-battery) system according to some embodiments of the present invention. FIG. 8A shows an electric vehicle comprising an electric drive system 840 driving an axle of the vehicle. Other electric drive system can be used, and other electric drive components can be included, instead of in addition to the system shown. In addition, the electric vehicle further comprises a non-electric (including non-battery) charger system 810 comprising a generator, such as a gasoline-powered generator 880, powering by a separate power source such as a gasoline tank 884. The non-electric charger system 810 can provide emergency power to the battery when the battery is running out, or provide continuous battery charging during long distance travel. The non-electric support system can be used with or without non-electric drive assembly or generator as disclosed above.

The charger system 810 can comprise a solar powered generator, a natural gas powered generator, a compressed air generator, or a generator using any non-battery type of power.

In some embodiments, the vehicle is operated in electric drive mode. In out-of-battery emergency situation, the vehicle is stopped. The non-electric charger system 810 can then be started to charge the battery. Thus the electric vehicle can be restarted after a short time to recharge the battery. Alternatively, the non-electric charger system 810 can be started when the battery power reaches a certain level. This can ensure that the electric vehicle always has electric power to drive. The starting of the non-electric charger system 810 can be automatic or manual.

In some embodiments, the vehicle is operated in electric drive mode, together with the operation of the non-electric charger system 810. For example, in planning a long distance travel, a distance longer than the range of the battery, the electric vehicle can be in charging mode during driving.

This can ensure that the battery has enough power to reach the destination without stopping for recharging.

FIG. 8B shows an electric vehicle comprising an electric drive system 840 driving an axle of the vehicle, together with a non-electric support system 820, such as a compressed-air air-conditioner 870, powered by compressed air cylinder 874, included to provide air conditioner comfort to the electric vehicle. The non-electric support system can be used with or without non-electric drive assembly or generator as disclosed above.

The support system 820 can comprise an air conditioner, a heater, a fan, an electronic support, a lighting system, etc., powered by solar panels, natural gas, gasoline, diesel, compressed air, or any non-battery type of power.

In some embodiments, the vehicle is operated by the electric drive to drive the vehicle. The non-electric support system can be operated to provide support functions to the vehicle, either when the vehicle is running or when the vehicle is not running. For example, the air-conditioner can be turned on or off depending on the need of the user, regardless of the conditions of the electric drive system.

In some embodiments, the present invention discloses a hybrid battery vehicle with improved performance, with or without compromising the range of the battery. The hybrid battery vehicle can include an electric drive system engage-able to an axle of the vehicle. The hybrid battery vehicle can include a non-electric drive system engage-able to another axle of the vehicle. Either drive system can drive the vehicle when engaged with the vehicle axle.

A controller can be included for controlling the hybrid battery vehicle in different operation modes. An operation can be a pure electric vehicle mode. In this mode, only the electric drive system is used to run the vehicle. The non-electric drive system is disengaged, and not contributed to the running operation of the vehicle. This operation mode can be a main operation mode for the electric vehicle, which can provide zero emission to the environment.

Another operation can be a pure non-electric vehicle mode. In this mode, only the non-electric drive system is used to run the vehicle. The electric drive system is disengaged, and not contributed to the running operation of the vehicle. This operation mode can be an emergency operation mode for the electric vehicle, which can allow the vehicle to run when the electric drive system is not operationable, for example, when the battery is depleted. The non-electric drive system can charge the battery, to allow the vehicle to run on battery power after a certain period of charging. For example, the vehicle can run in a zero-emission zone after being charged by the non-electric drive system. This operation mode can also be used for special purposes. For example, a vehicle can enter a race using the non-electric drive system.

Another operation can be an electric vehicle mode with non-electric assistance. In this mode, the non-electric drive system can assist the electric drive system to improve the performance of the hybrid vehicle. The performance improvement can be provided with or without consideration of the behavior of the electric drive system, such as the consideration of the range of the hybrid vehicle under the electric drive system, e.g., the rate of the depletion of the battery used to power the electric drive system.

In some embodiments, the controller can let the non-electric drive system to assist the electric drive system during acceleration. The hybrid vehicle can be used primarily in battery power mode, e.g., using the electric drive system to operate the hybrid vehicle for high mileage and low emission. During acceleration time, such as when the vehicle just starts from a stationary position, when the vehicle increases from a low speed to a higher speed, when the vehicle is under heavy load such as climbing a hill or going on a slope, or when the vehicle accelerates to pass another vehicle, the non-electric drive can also run, in addition to the electric drive, to quickly accelerate the vehicle to the desired speed.

For example, the non-electric drive system can be at an idle status, thus can quickly ramp up to speed when the operator presses on the acceleration pedal to start the electric drive system to operate the vehicle. Alternatively, the non-electric drive system can include combustion engine with fast start up time. Thus the non-electric drive system can quickly ramp up to speed from stopping position, without the idling time. This can assist in saving the energy needed for idling of the non-electric drive.

In some embodiments, the non-electric drive assistance during acceleration time can be performed to improve performance of the vehicle, e.g., without regard to the consumption of battery power of the electric drive or fuel for the non-electric drive. Maximum powers of the electric drive and the non-electric drive can be used. Alternatively, maximum powers of the electric drive or the non-electric drive can be used. Alternatively, high powers of the electric drive and/or the non-electric drive can be used, to optimally achieve the desired acceleration, e.g., based on the operator actions, which can be exemplified by the acceleration pedal behavior.

In some embodiments, the non-electric drive assistance during acceleration time can be performed to improve performance of the electric drive system, for example, to reduce the consumption of battery power to extend the range of the hybrid vehicle under battery power. Since acceleration can be a high battery power drain, especially with respect to range, e.g., high battery power can be rushed to the electric drive system with minimal distance traveled, the consumption of the battery power can be limited, for example, by the controller, during the acceleration time. The non-electrical drive can assist to achieve an acceptable acceleration performance.

For example, the electric drive system can have a current limiter, e.g., the electric drive system can have a constraint of a maximum current, such as during acceleration time. The maximum current constraint can improve the range of the vehicle, for example, by reduce the consumption of the battery power, at the expense of poor acceleration performance. The non-electric drive system can assist, to improve the acceleration performance with preserving or improving the battery range.

In some embodiments, during acceleration, the percentage of the power of the non-electric drive can be 100% (meaning acceleration depends only on the non-electric drive system), 90%, 80%, 70%, 60%, or higher than 50%, of the total power used by the vehicle during acceleration time.

In some embodiments, during acceleration, the current or battery power used by the electric drive can be limited to 0% (meaning no battery power used during acceleration), between 0 to 100%, 100% (meaning current or battery power used during acceleration is the same as the current or battery power used during the vehicle cruising time), 150%, 200%, 250%, 300%, 350%, 400%, 500%, or higher, than the current or battery power used during the vehicle cruising time to achieve a desired range. Thus, the maximum current or battery power can be set for the acceleration performance of the electric drive system, without, with minimum effect, or without detrimental effect, on the range of the vehicle under battery power. For example, if the maximum current or power is set to 0% (meaning all acceleration is performed by the non-electric drive), the range is not affected by the acceleration processes. If the maximum current or power is set to less than 100%, around 100%, or a little above 100%, the range can be only slightly affected by the acceleration processes. In some embodiments, the maximum current or power is set to prevent detrimental effect to the battery range, such as a current or power that consumes less than 20%, 10%, 50%, 2%, or 1% of the remaining battery power.

In some embodiments, the controller can let the non-electric drive system to assist the electric drive system during high speed travelling. The hybrid vehicle can be used primarily in battery power mode, e.g., using the electric drive system to operate the hybrid vehicle for high mileage and low emission. During high speed travelling time, such as when the vehicle is on a highway travelling at a speed limit, the non-electric drive can also run, in addition to the electric drive, to assist the vehicle at the desired speed.

In some embodiments, the non-electric drive assistance during high speed travelling time can be performed to improve performance of the vehicle, e.g., without regard to the consumption of battery power of the electric drive or fuel for the non-electric drive. Maximum powers of the electric drive and the non-electric drive can be used. Alternatively, maximum powers of the electric drive or the non-electric drive can be used. Alternatively, high powers of the electric drive and/or the non-electric drive can be used, to optimally achieve the desired high speed, e.g., for lowest battery and/or fuel consumption.

In some embodiments, the non-electric drive assistance during high speed travelling time can be performed to improve performance of the electric drive system, for example, to reduce the consumption of battery power to extend the range of the hybrid vehicle under battery power. Since the relationship between speed and battery power consumption can be non linear, the consumption of the battery power can be limited, for example, by the controller, during the high speed travelling time that severely depletes the battery. The non-electrical drive can be used to boost the speed to the desired speed.

For example, the electric drive system can have a current limiter, e.g., the electric drive system can have a constraint of a maximum current, such as at the start of the non linear behavior of the battery power consumption. The maximum current constraint can improve the range of the vehicle, for example, by reducing the consumption of the battery power at the battery behavior curve that uses more power than distance travelled.

For example, the speed and power consumption curve for a vehicle can have a linear portion, e.g., doubling the speed resulting in doubling the power consumption. In this linear portion, the vehicle speed can increase with minimum effect on the range performance, since doubling the speed can result in doubling the travel distance and battery power, or a same travel range.

At the limit of the linear portion, the curve can be non-linear, since at high enough speed, the drag resistance on the vehicle can be much higher, e.g., no longer linearly increasing. At the non linear portion of the speed and power consumption curve, the range performance can be reduced, since doubling the speed can result in more than doubling the power consumption, or a lower travel range for the battery. The non-electric drive system can assist at the non linear portion, e.g., at a transition of the linear portion to non linear portion, to increase the vehicle speed while preserving the battery range.

In some embodiments, the linear portion of the curve can be determined by a constant ratio of the power consumption over the speed. The constant ratio can include the fluctuation, e.g., an average constant ratio. The transition of the linear portion to non linear portion can be determined by an increase of the ratio of the power consumption over the speed, such as greater than 2%, 5, 10%, 15%, or 20% of the average ratio of the linear portion. The maximum ratio can be set by the controller, as a trade off between performance and range of the vehicle. Thus, when the speed is within the linear portion, the electric drive system can be used to operate the vehicle. When the speed passes over to the non linear portion, for example, when the ratio of the power consumption over the speed exceeds a predetermined number, such as 5%, the non electric drive can start to assist the electric drive, to either maintain the existing ratio, or to reduce the ratio to an optimal linear portion ratio, to achieve an optimal range.

Another operation can be a non-electric vehicle mode with electric assistance. In this mode, the electric drive system can assist the non-electric drive system to improve the performance of the hybrid vehicle. The performance improvement can be provided with or without consideration of the behavior of the electric and/or non-electric drive system, such as the consideration of the range of the hybrid vehicle under the electric drive system, or the consumption of the fuel for the non-electric drive system.

In some embodiments, the controller can let the electric drive system to assist the non-electric drive system during acceleration. The hybrid vehicle can be used in fuel mode, e.g., using the non-electric drive system to operate the hybrid vehicle for high performance. During acceleration time, such as when the vehicle just starts from a stationary position, when the vehicle increases from a low speed to a higher speed, when the vehicle is under heavy load such as climbing a hill or going on a slope, or when the vehicle accelerates to pass another vehicle, the electric drive can also run, in addition to the non-electric drive, to quickly accelerate the vehicle to the desired speed. Since the electric drive can provide high acceleration, as compared to non-electric drive, the assistance of the electric drive can be beneficial to the operation of the non-electric drive.

In some embodiments, the electric drive assistance during acceleration time can be performed to improve performance of the vehicle, e.g., with or without regard to the consumption of battery power of the electric drive or fuel for the non-electric drive. For example, the battery can be re-charged by the non-electric drive during a normal operation of the non-electric drive. Thus, the consumption of battery power during the acceleration can improve the performance of the vehicle, while not depleting the battery power.

In some embodiments, the electric drive assistance during acceleration time can be performed to improve performance of the non-electric drive system with minimum consumption of battery power.

In some embodiments, the controller can let the electric drive system to assist the non-electric drive system during high speed travelling. The hybrid vehicle can be used in fuel mode, e.g., using the non-electric drive system to operate the hybrid vehicle for performance. During high speed travelling time, such as when the vehicle is on a highway travelling at a speed limit, or when the vehicle is at a race track, the electric drive can also run, in addition to the non-electric drive, to assist the vehicle at the desired speed.

In the assistance mode, e.g., two drive systems operate simultaneously, the controller can perform a speed matching of the drive systems to prevent or reduce shocks to the vehicle. For example, the vehicle can be operated on the electric drive at a certain speed. If the vehicle desires an acceleration that requires the assistance of the non-electric drive, for example, a fast acceleration that can have detrimental effect on the battery range, the non-electric drive can start and engaged to the axle to provide the needed power for the acceleration.

Before the axle engagement, the non-electric drive can be rotated at a similar speed as the rotating axle (since the axle has been rotated due to the movement of the vehicle under the electric drive acting on the other axle). Thus, when engaged, the two similar speeds can provide a smooth transition of the coupling of the non-electric drive to the vehicle. The non-electric drive then can provide power to the axle, accelerating the vehicle beyond the power provided by the electric drive. Similar operations can be performed, for the electric drive to engage the axle when the non-electric drive is operating on the other axle.

FIGS. 9A-9D illustrate an exemplary hybrid vehicle according to some embodiments. In FIG. 9A, the vehicle comprises an electric drive system 940 coupled to axle 911 to operate the vehicle. In some embodiments, the electric drive system comprises a battery 927 powering a motor 926, which is coupled to gearbox 925 to drive axle 911. An optional controller 928 is coupled to the motor 926 to control the motor, such as providing more power when needing high acceleration, or to regulate the power to the motor to optimize the consumption of electrical power from the battery. As shown, the electric drive system 940 represents an exemplary electric drive system. Other electric drive systems can also be used, such as motor-on-wheel and battery management system.

In some embodiments, the vehicle comprises a non-electric (included non-battery) drive assembly 960, which comprises a non-electric power train. The non-electric drive assembly 960 comprises a non-electric engine, for example, an internal combustion engine 913, powered by a power source, for example, a gasoline tank 914, and coupled to a gearbox 912 to drive the axle 910. The non-electric drive assembly 960 can comprise an optional controller 918 coupled to the engine 913 to control, monitor, and optimize power consumption. The non-electric drive assembly 960 can drive the axle 910 independent of the electric drive system 940 driving the other axle 911.

In some embodiments, the non-electric drive assembly 960 can drive the axle 911, for example, by sharing a gear box with the electric drive assembly, or by a separate coupling with the axle 911. For example, the drive systems 940 and 960 drive the axle 911 of the electric vehicle through a mutually exclusive gearbox. In some embodiments, the electric drive assembly and the non-electric drive assembly are independently operated, thus if sharing an axle, one drive is decoupled from that axle so that the other drive can operate.

A vehicle controller 945 coupled to the electric drive system 940 and the non-electric drive assembly 960, for example, to control both drive systems. The two drive systems are separate and operate independent of each other, with only the controller 945 connecting the two systems. Thus any non-electric drive technology can be used without any modification. In addition, the electric drive system can also be easily upgraded with advanced electric drive technology, such as better battery or better motor. The present electric vehicle is ready for today technology, ready to incorporate better electric power technology, and employing current non-electric power technology without any needless modifications.

In some embodiments, the controller 945 allows different modes of operation of the electric and non-electric power drives, including electric only, non-electric only, electric with non-electric assistance, and non-electric with electric assistance. Charging operation can also be provided, during non-electric drive, either in non-electric only, electric with non-electric assistance, or non-electric with electric assistance.

FIGS. 9B-9D show different configurations for the controller in providing different operation modes. In FIG. 9B, the controller can provide electric only (E), non-electric only (NE), electric with non-electric assistance (E+NE), and non-electric with electric assistance (NE+E). A neutral position 970 can provide a transition between the operation modes.

In some embodiments, the controller can have simplified reverse gear (R). For example, in primarily electric mode (E and E+NE), the reverse gear can be for electric only, meaning the non-electric assistance can be restricted to forward drive only. Similarly, in primarily non-electric mode (NE and NE+E), the reverse gear can be for non-electric only, meaning the electric assistance can be restricted to forward drive only.

Alternatively, the reverse gear can be similar to the forward gear, meaning the assistance can be applied to both forward and reverse.

In some embodiments, the controller can provide a simplified operation configuration, including only the electric only (E), the electric with non-electric assistance (E+NE), and non-electric with electric assistance (NE+E). Since the assistance mode for the non-electric drive can improve the performance without or with minimum affect on the battery, the assistance mode can be used instead of non-electric only mode (FIG. 9C).

In some embodiments, the controller can provide a simplified operation configuration, including only the electric with non-electric assistance (E+NE), and non-electric with electric assistance (NE+E). Since the assistance mode can improve the performance without or with minimum affect on the battery range, the assistance mode can be used instead of electric only mode (FIG. 9D).

Other configurations can be used, such as electric only (E), non-electric only (NE), and non-electric with electric assistance (NE+E).

The controller can turn on, turn off, engage, or dis-engage the electric and non-electric drives. For example, when the control is moved to the electric drive E, the electric drive system is engaged (and turned on), and the non-electric drive system is disengaged (can be turned on or turned off). Conversely, when the control 970 is moved to the non-electric drive NE, the electric drive system is disengaged (can be turned on or turned off), and the non-electric drive system is engaged (and turned on). Short start up time for electric drive may mean instantaneous power when turned on, so for electric power, engaging and disengaging could mean powering on and powering off. For non-electric power, disengaging might mean an idle position, where the drive is turned on but not engaged. fast start non-electric power can mean an instantaneous running, without idling time.

In some embodiments, the controller 945 is a manual controller, under the exclusive control of the driver. The manual controller offers great control to the driver without or with minimum loss of control. For example, the driver knows when to stop the electric drive, and when to start the non-electric drive. Sensors could help to inform the driver of the conditions of the vehicle, such as the level of battery, and how far can the vehicle travel under electric power. Power conservation could be best performed by the driver, instead of an automatic controller. In some embodiments, the controller 945 can have a partially automatic mode, for example, by automatically switching to non-electric power when the electric power is depleted.

In this description, the term "vehicle" or other similar term is meant to be a motor vehicle, such as a passenger automobile, a sports utility vehicle (SUV), a bus, a truck, or any other types of automobiles.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that is has the full scope defined by the language of the following claims, and equivalents thereof.

What is claimed is:

1. A vehicle comprising
a first drive system configured to drive a first wheel of the vehicle, wherein the first drive system comprises a battery powering an electric motor;
a second drive system configured to drive a second wheel of the vehicle, wherein the second drive system is powered by a non-battery power source,
wherein the first wheel is coupled to a first axle, wherein the second wheel is coupled to a second axle, wherein the first axle is different from the second axle;
a controller operatable by a driver of the vehicle,
wherein the controller is configured to provide a first mode of operation, wherein in the first mode of operation, the first drive system drives the first wheel and the second drive system is excluded from driving the second wheel,
wherein the controller is configured to provide a second mode of operation, wherein in the second mode of operation, the second drive system drives the second wheel and the first drive system is excluded from driving the first wheel,
wherein the controller is configured to provide a third mode of operation, wherein in the third mode of operation, the first drive system drives the first wheel and the second drive system assists the first drive system by simultaneously driving the second wheel during an acceleration of the vehicle,
wherein in the acceleration, a power used by the first drive system is limited to a predetermined maximum power,
wherein in the acceleration, the first drive system is configured to operate at up to a predetermined maximum power,
wherein the predetermined power is 200% of the battery power used during vehicle cruising time.

2. A vehicle as in claim 1
wherein a preservation or a prevention of a reduction of a battery range includes less than 10% reduction of the battery range.

3. A vehicle as in claim 1
wherein in the acceleration, the first drive system is configured to operate at up to a maximum ratio of speed over battery consumption of less than 2 times an average ratio of speed over battery consumption of the vehicle.

4. A vehicle as in claim 1
wherein in the acceleration, the second drive system uses more power than the first drive system.

5. A vehicle as in claim 1
wherein in the third mode of operation, the first drive system drives the first wheel and the second drive system assists the first drive system by simultaneously driving the second wheel to achieve a vehicle speed while preserving or preventing a reduction of a battery range of the vehicle.

6. A vehicle as in claim 1
wherein in the third mode of operation, the first drive system drives the first wheel at a first speed of an average ratio of speed over battery consumption of the vehicle, and the second drive system assists the first drive system by simultaneously driving the second wheel to achieve a desired speed higher than the first speed.

7. A vehicle as in claim 1
wherein in the third mode of operation, the first drive system drives the first wheel at a first speed of a limit of a linear portion of speed over battery consumption of the vehicle, and the second drive system assists the first drive system by simultaneously driving the second wheel to achieve a desired speed higher than the first speed.

8. A vehicle as in claim 1
wherein in the acceleration, the second drive system is configured to match the rotational speed of the first or second wheel before engaging with the second wheel.

9. A vehicle comprising
a first drive system configured to drive a first wheel of the vehicle, wherein the first drive system comprises a battery powering an electric motor;
a second drive system configured to drive a second wheel of the vehicle, wherein the second drive system is powered by a non-battery power source,
wherein the first wheel is coupled to a first axle, wherein the second wheel is coupled to a second axle, wherein the first axle is different from the second axle,
wherein the second drive system is configured to operate at a maximum power that is less than the maximum power of the first drive system;
a controller operatable by a driver of the vehicle,
wherein the controller is configured to provide a first mode of operation, wherein in the first mode of operation, the first drive system drives the first wheel and the second drive system is excluded from driving the second wheel,
wherein the controller is configured to provide a second mode of operation,
wherein in the second mode of operation, the second drive system drives the second wheel and the first drive system is excluded from driving the first wheel,
wherein the controller is configured to provide a third mode of operation, wherein in the third mode of operation, the first drive system drives the first wheel and the second drive system assists the first drive system by simultaneously driving the second wheel during an acceleration of the vehicle,
wherein in the acceleration, the first drive system is configured to operate at up to a power value configured to achieve a speed at a limit of a linear portion of speed over battery consumption of the vehicle.

10. A vehicle as in claim 9
wherein in the third mode of operation, the first drive system is configured to operate at a maximum ratio of speed over battery consumption of less than 2 times an average ratio of speed over battery consumption of the vehicle.

11. A vehicle as in claim 9
wherein the second drive system comprises a gasoline engine having an engine displacement volume of less than 1 liter.

12. A vehicle as in claim 9
wherein the second drive system comprises a gasoline engine having one or two cylinders.

13. A vehicle as in claim 9
wherein the second drive system comprises a motorcycle gasoline engine.

14. A vehicle as in claim 9
wherein the second drive system is configured to operate at a maximum power of 50% of the maximum power of the first drive system.

15. A vehicle as in claim 9
wherein the maximum power comprises a power that the first drive system is configured to operate at a speed of less than 2 times an average speed of the vehicle to achieve the battery range.

16. A vehicle as in claim 9
wherein in the third mode of operation, the first drive system drives the first wheel at the power value, and the second drive system assists the first drive system by simultaneously driving the second wheel to achieve a desired speed higher than a speed achieved by the first drive at the power value.

17. A vehicle as in claim 9
wherein the limit of a linear portion of speed over battery consumption is determined by an increase greater than 10% of the ratio of the power consumption over the speed.

18. A vehicle comprising
a first drive system configured to drive a first wheel of the vehicle, wherein the first drive system comprises a battery powering an electric motor;
a second drive system configured to drive a second wheel of the vehicle, wherein the second drive system is powered by a non-battery power source,
wherein the first wheel is coupled to a first axle, wherein the second wheel is coupled to a second axle, wherein the first axle is different from the second axle;
a controller operatable by a driver of the vehicle,
wherein the controller is configured to provide a first mode of operation, wherein in the first mode of operation, the first drive system drives the first wheel and the second drive system is excluded from driving the second wheel,
wherein the controller is configured to provide a second mode of operation, wherein in the second mode of operation, the second drive system drives the second wheel and the first drive system is excluded from driving the first wheel,
wherein the controller is configured to provide a third mode of operation, wherein in the third mode of operation, the first drive system drives the first wheel and the second drive system assists the first drive system by simultaneously driving the second wheel during an acceleration of the vehicle,
wherein in the acceleration, a power used by the first drive system is limited to a predetermined maximum power,
wherein in the third mode of operation, the first drive system drives the first wheel at a first speed of a limit of a linear portion of speed over battery consumption of the vehicle, and the second drive system assists the first drive system by simultaneously driving the second wheel to achieve a desired speed higher than the first speed.

19. A vehicle as in claim 18,
wherein in the acceleration, the first drive system is limited to operate at a predetermined maximum power that accelerates the vehicle to a maximum speed of less than 2 times an average speed of the vehicle.

* * * * *